US012528175B2

(12) United States Patent
Li et al.

(10) Patent No.: US 12,528,175 B2
(45) Date of Patent: Jan. 20, 2026

(54) SWITCH STRUCTURE FOR AN ELECTRIC TOOL

(71) Applicant: Nanjing Chervon Industry Co., Ltd., Nanjing (CN)

(72) Inventors: Jiayu Li, Nanjing (CN); Xiang Zhao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 673 days.

(21) Appl. No.: 17/319,287

(22) Filed: May 13, 2021

(65) Prior Publication Data

US 2021/0362317 A1 Nov. 25, 2021

(30) Foreign Application Priority Data

May 21, 2020 (CN) ........................ 202010435811.X
May 21, 2020 (CN) ........................ 202010438943.8

(51) Int. Cl.
*B25F 5/02* (2006.01)
*B24B 23/02* (2006.01)

(52) U.S. Cl.
CPC .............. *B25F 5/02* (2013.01); *B24B 23/028* (2013.01)

(58) Field of Classification Search
CPC .... B25F 5/02; B25F 5/00; B25F 5/026; B25F 5/029; B25G 1/00; B25G 1/002; B25G 1/06; B25G 1/08; B25G 3/00; B25G 3/38; H01H 23/141; H01H 2231/048; H01H 21/28
See application file for complete search history.

(56) References Cited

U.S. PATENT DOCUMENTS 2,517,882 A * 8/1950 Johnson ............. B23Q 17/2404 408/124
3,917,921 A * 11/1975 Jakubauskas ...... H01H 11/0056 200/16 R
6,810,970 B1 * 11/2004 Kraenzler ................. B25F 5/02 173/217
11,393,646 B2 * 7/2022 Iniguez .................... H01H 9/06
(Continued)

FOREIGN PATENT DOCUMENTS

CN 104924279 A 9/2015
CN 106573368 A 4/2017
(Continued)

*Primary Examiner* — Monica S Carter
*Assistant Examiner* — Kent N Shum
(74) *Attorney, Agent, or Firm* — Greenberg Traurig, LLP

(57) ABSTRACT

An electric tool includes a body housing, a motor, a signal switch, and an operating component. The body housing includes a first housing portion, a second housing portion, and a third housing portion which are arranged sequentially from front to back. The motor is supported in the first housing portion and includes a motor shaft rotatable around a rotation axis. The signal switch includes a trigger portion capable of being triggered to control start-up or interruption of the motor. The operating component is disposed on the body housing, and the operating component is configured to move on the body housing to turn on or off the signal switch. A moving direction of the trigger portion is substantially perpendicular to an operating direction of the operating component.

13 Claims, 15 Drawing Sheets

(56) References Cited

U.S. PATENT DOCUMENTS

| | | | | |
|---|---|---|---|---|
| 2002/0088700 | A1* | 7/2002 | Banfield | H01H 15/107 200/573 |
| 2012/0129435 | A1* | 5/2012 | Ikuta | B25F 5/006 451/358 |
| 2012/0160529 | A1* | 6/2012 | Eshleman | B25F 5/00 173/1 |
| 2012/0325509 | A1* | 12/2012 | Puzio | B25B 21/02 81/177.85 |
| 2014/0208600 | A1* | 7/2014 | Moreno | B23Q 5/027 30/388 |
| 2014/0284195 | A1* | 9/2014 | Fujita | H01H 13/12 200/536 |
| 2015/0263592 | A1* | 9/2015 | Kawakami | B25F 5/008 451/359 |
| 2015/0280532 | A1* | 10/2015 | Mizutani | H02K 7/14 310/50 |
| 2017/0125189 | A1* | 5/2017 | Domzalski | H01H 13/14 |
| 2017/0125192 | A1* | 5/2017 | Hanai | H01H 21/00 |
| 2018/0283508 | A1* | 10/2018 | Aoki | B25F 5/02 |
| 2019/0070705 | A1* | 3/2019 | Ishikawa | B24B 23/03 |
| 2019/0299387 | A1* | 10/2019 | Kotsuji | B25F 5/02 |
| 2019/0393000 | A1* | 12/2019 | Shinohara | H01H 1/12 |
| 2020/0198099 | A1* | 6/2020 | Chen | B25B 21/00 |
| 2021/0220959 | A1* | 7/2021 | Matsubara | B24B 23/02 |
| 2021/0268637 | A1* | 9/2021 | Goto | B24B 23/028 |
| 2023/0170902 | A1* | 6/2023 | Koschel | H03K 17/962 173/1 |

FOREIGN PATENT DOCUMENTS

| | | | |
|---|---|---|---|
| CN | 110167716 | A | 8/2019 |
| CN | 209705776 | U | 11/2019 |
| EP | 2639016 | A1 | 9/2013 |

* cited by examiner

SWITCH STRUCTURE FOR AN ELECTRIC TOOL

RELATED APPLICATION INFORMATION

This application claims the benefit under 35 U.S.C. § 119(a) of Chinese Patent Application No. CN 202010438943.8, filed on May 21, 2020, and Chinese Patent Application No. CN 202010435811.X, filed on May 21, 2020.

BACKGROUND

An electric tool typically includes a housing and a motor and a transmission mechanism disposed in the housing. The motor drives through the transmission mechanism a main shaft to perform actions such as impact or rotation. The housing is provided with a holding portion which is convenient for a human to hold with a hand. A switch knob of the electric tool is typically disposed at a front end of the holding portion, which is convenient for starting and stopping operations during holding.

An existing power tool drives the motor to rotate with a current provided by a loaded power supply. The power supply is connected to the motor through a motor wire, a switch structure is typically disposed between the motor and the power supply, and the motor wire passes through the switch structure. The motor wire and the switch structure occupy a relatively large space, resulting in local limitations of other components in the machine body, which is not conducive to reducing a size of the whole machine.

In addition, in a process of controlling the switch structure to turn on or off by an operating component on the body housing, the operating component rubs with the motor wires, resulting in wear of the motor wire and even leakage accidents.

Moreover, the switch of the existing electric tool is typically disposed in the holding portion which is used for the user to hold, so that a size of the holding portion is relatively large and it is inconvenient for a user to hold.

SUMMARY

In one aspect of the disclosure, an electric tool is provided. The electric tool includes a body housing, a control mechanism, a motor, a signal switch, and an operating component. The body housing includes a first housing portion, a second housing portion, and a third housing portion which are arranged sequentially from front to back. The first housing portion is connected to a working assembly, the third housing portion is connected to a power supply, and the second housing portion is configured for a user to hold. The control mechanism is disposed in the body housing and configured to control operation of the working assembly, and the control mechanism is electrically connected to the power supply. The motor is supported in the first housing portion by a bearing. The motor is electrically connected to the control mechanism through a motor wire, and the motor includes a motor shaft rotatable around a rotation axis. The signal switch is electrically connected to the control mechanism through a control wire and includes a trigger portion capable of being triggered to control start-up or interruption of the motor. The operating component is disposed on the body housing, and the operating component is configured to move on the body housing to turn on or off the signal switch. A moving direction of the trigger portion is substantially parallel to or perpendicular to an operating direction of the operating component, where substantially means within normal manufacturing tolerances within the industry.

In some examples, a sum of a size of the signal switch in a direction of the rotation axis and a size of the motor in the direction of the rotation axis is greater than a size of a whole which is formed by the signal switch and the motor in the direction of the rotation axis.

In some examples, the electric tool further includes a reversing piece disposed between the operating component and the signal switch, and the reversing piece is disposed between the operating component and the signal switch such that the operating direction of the operating component is different from the moving direction of the trigger portion.

In some examples, the operating direction of the operating component is parallel to the rotation axis.

In some examples, the moving direction of the trigger portion is perpendicular to the rotation axis.

In some examples, the electric tool further includes an output assembly, the output assembly includes an output shaft rotatable about an output axis, and the output axis is perpendicular to the moving direction of the trigger portion.

In some examples, the body housing includes a left housing portion and a right housing portion separable from each other, and the electric tool further includes a mounting piece configured to mount the signal switch to one of the left housing portion and the right housing portion.

In some examples, the mounting piece is a screw.

In some examples, the signal switch is disposed in the first housing portion.

In some examples, the signal switch is disposed in a transition region between the first housing portion and the second housing portion, and the transition region is a region connecting the first housing portion and the second housing portion and having varying outer diameters.

In some examples, the body housing extends substantially in a straight line.

In some examples, an outer diameter of the second housing portion is less than an outer diameter of the first housing portion.

In some examples, a carrying current of the motor wire is greater than a carrying current of the control wire.

In some examples, the signal switch is disposed on an upper side of the rotation axis of the motor.

In some examples, the electric tool is an angle grinder.

In some examples, the signal switch and the operating component are both disposed on an upper side of the rotation axis of the motor.

In some examples, the signal switch further includes an elastic piece, and the elastic piece is configured to trigger the trigger portion to drive the signal switch to turn on in response to the elastic piece being operated by the operating component.

In another aspect of the disclosure, an electric tool is provided. The electric tool includes a body housing, a motor, a signal switch, and an operating component. The body housing includes a first housing portion, a second housing portion, and a third housing portion which are arranged sequentially from front to back. The first housing portion is connected to a working assembly, the third housing portion is connected to a power supply, and the second housing portion is configured for a user to hold. The motor is supported in the first housing portion by a bearing and includes a motor shaft rotatable around a rotation axis. The signal switch includes a trigger portion capable of being triggered to control start-up or interruption of the motor. The operating component is disposed on the body housing, and the operating component is configured to move on the body housing to turn on or off the signal switch. A moving direction of the trigger portion is substantially perpendicular to an operating direction of the operating component.

In some examples, the signal switch further includes an elastic piece, and the elastic piece is configured to trigger the trigger portion to drive the signal switch to turn on in response to the elastic piece being operated by the operating component.

In an additional aspect of the disclosure, an electric tool is provided. The electric tool includes a body housing, a motor, a signal switch, and an operating component. The body housing includes a first housing portion, a second housing portion, and a third housing portion which are arranged sequentially from front to back. The first housing portion is connected to a working assembly, the third housing portion is connected to a power supply, and the second housing portion is configured for a user to hold. The motor is supported in the first housing portion by a bearing and includes a motor shaft rotatable around a rotation axis. The signal switch includes a trigger portion capable of being triggered to control start-up or interruption of the motor. The operating component is disposed on the body housing, and the operating component is configured to move on the body housing to turn on or off the signal switch. The signal switch is disposed in the first housing portion; or the signal switch is disposed in a transition region between the first housing portion and the second housing portion, and the transition region is a region connecting the first housing portion and the second housing portion and having varying outer diameters.

In some examples, the electric tool is an angle grinder, and the operating component is movable along a straight line parallel to rotation axis with respect to the body housing.

DETAILED DESCRIPTION

Figure 1:
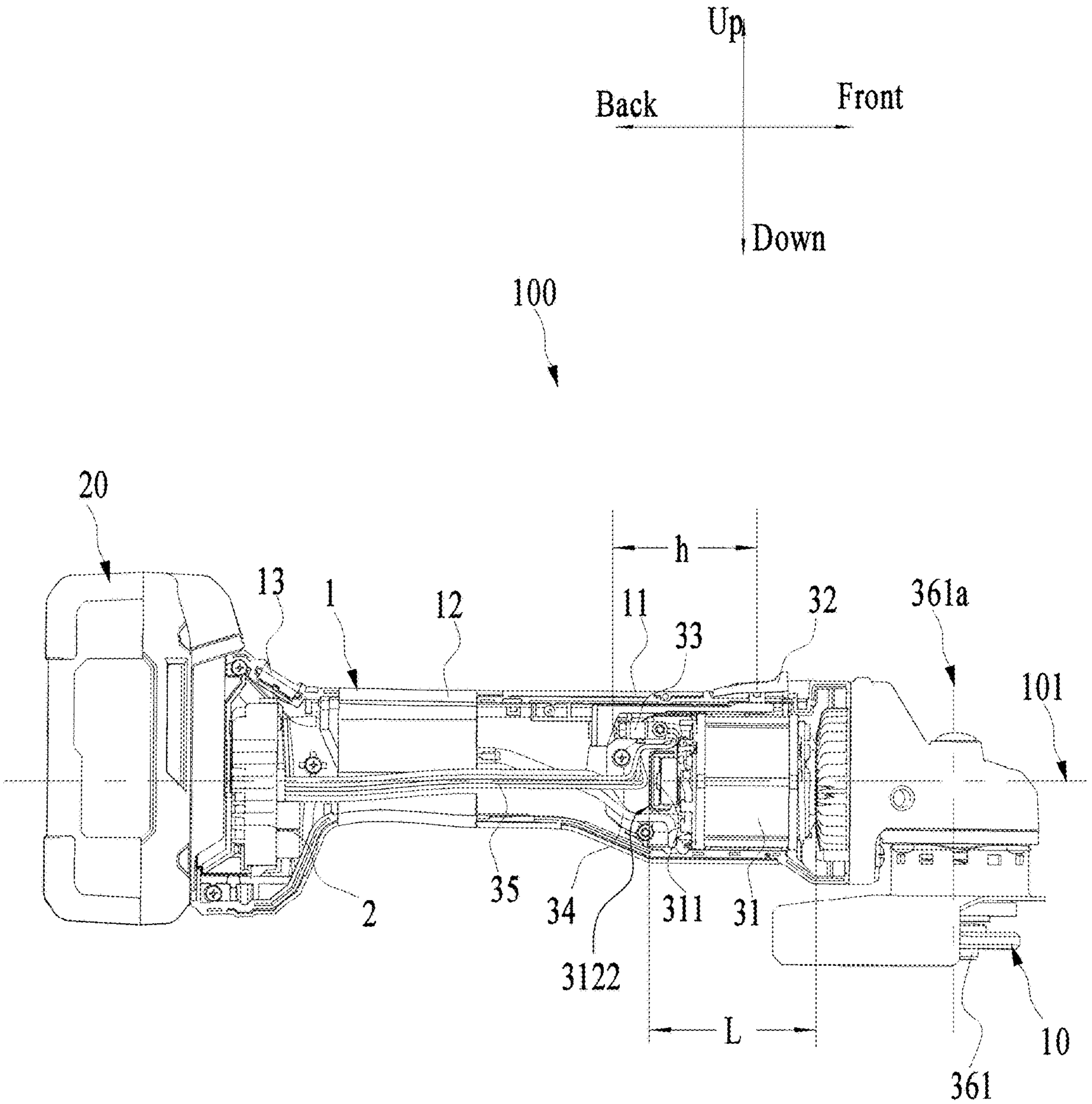
FIG. 1 is an inside view of an electric tool according to a first example.
Figure 2:
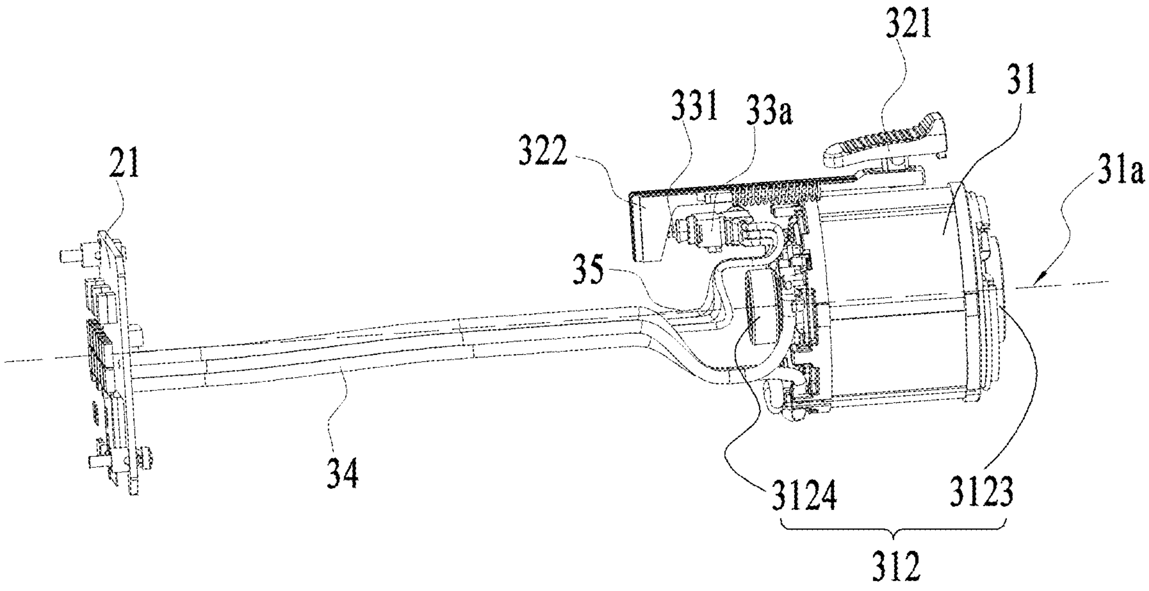
FIG. 2 is a perspective view of a partial structure of FIG. 1.

Referring to FIG. 1 and FIG. 2, a first example provides an electric tool 100. The electric tool 100 includes a body, a working assembly 10, and a power supply 20. The working assembly 10 is disposed at a front end of the body, and the power supply 20 is disposed at a back end of the body. The electric tool 100 is a hand-held electric tool 100, specifically an angle grinder, and more specifically, a direct current angle grinder. Of course, the electric tool 100 includes, but is not limited to, a screwdriver, an electric drill, a wrench, a sanding device, a curve saw, and other tools that are required to be powered.

The body includes a body housing 1. The body housing 1 includes a first housing portion 11, a second housing portion 12, and a third housing portion 13 which are arranged sequentially from front to back. The first housing portion 11 is connected to a working assembly 10, and the third housing portion 13 is connected to the power supply 20. In this example, the body housing 1 substantially extends along a first straight line 101, and the body housing 1 extends substantially in a straight line. The second housing portion 12 is disposed between the first housing portion 11 and the third housing portion 13, and the second housing portion 12 forms a holding portion for a user to hold. A main part of the holding portion is formed by the second housing portion 12, and a part of the first housing portion 11 close to the second housing portion 12 may also serve as a part of the holding portion.

The electric tool 100 further includes a control mechanism 2, a motor 31, and an operating component 32. The control mechanism 2 is disposed in the body housing 1 and configured to control operation of the working assembly 10, and the control mechanism 2 is electrically connected to the power supply 20. The control mechanism 2 includes a circuit board 21, the motor 31 is disposed in the first housing portion 11, and the motor 31 is electrically connected to the control mechanism 2 through a motor wire 34. The operating component 32 is disposed on the body housing 1.

The electric tool 100 further includes a signal switch 33, the signal switch 33 is electrically connected to the control mechanism 2 through a control wire 35, and the motor wire 34 and the signal switch 33 are separated from each other. The operating component 32 is configured to move on the body housing 1 to turn on or off the signal switch 33, the signal switch 33 controls start-up or interruption of the motor 31, and the operating component 32 and the motor wire 34 are respectively disposed on two sides of the signal switch 33.

The motor wire 34 is separated from the signal switch 33, so that a signal switch 33 with a smaller volume may be used to control the motor 31 and an occupied space is small. The control mechanism 2 is electrically connected to the signal switch 33 and the motor 31, separately, so that an internal space of the body housing 1 can be fully utilized and the layout of other components is facilitated. The operating component 32 is configured to move on the body housing 1 to turn on or off the signal switch 33. The operating component 32 and the motor wire 34 are disposed on two sides of the signal switch 33, respectively, thereby avoiding the friction of the operating component 32 to the motor wire 34 in an operation process, prolonging the service life and reducing the failure rate.

The operating component 32 is controlled so that the signal switch 33 is triggered to turn on, the electric connection between the control wire 35 and the control mechanism 2 is turned on, and the control mechanism 2 controls the electric connection between the power supply 20 and the motor 31 to turn on through the motor wire 34, so that the motor 31 is started. Conversely, the operating component 32 is controlled to move away from the signal switch 33 so that the signal switch 33 is turned off, the electric connection between the control wire 35 and the control mechanism 2 is controlled to turn off, and the control mechanism 2 controls the electric connection between the power supply 20 and the motor 31 to turn off so that the motor 31 is interrupted.

Since the motor 31 has a relatively large rotational speed and torque, a carrying current of the motor wire 34 is greater than a carrying current of the control wire 35.

The motor 31 includes a motor shaft 311 and a bearing 312, the motor shaft 311 has a rotation axis 31*a* extending forward and backward along the body housing 1, and the bearing 312 rotatably supports the motor shaft 311 and disposed in a bearing chamber in the body housing 1. The bearing chamber includes a front bearing chamber 3121 and a back bearing chamber 3122 which are axially disposed, and the front bearing chamber 3121 and the back bearing chamber 3122 each are provided with a bearing 312, namely a front bearing 3123 in the front bearing chamber 3121 and a back bearing 3124 in the back bearing chamber 3122. The electric tool 100 further includes an output assembly connecting the motor 31 to the working assembly. The output assembly includes an output shaft 361, and the output shaft 361 is rotatable about an output axis 361 a perpendicular to the rotation axis 31*a*.

The operating component 32 is configured to move in a linear direction parallel to the rotation axis 31*a*, and the operating component 32 has an initial position. When the operating component 32 is in the initial position, the operating component 32 is not operated and the signal switch 33 is not triggered. The signal switch 33 includes a trigger portion 331 capable of being triggered, and the trigger portion 331 has a trigger position at which the trigger portion is triggered. The trigger position specifically refers to a position at which the operating component 32 is in contact with the trigger portion 331 and the signal switch 33 and is triggered. An axial distance between the initial position and the trigger position is h, an axial support distance of the motor 31 is L, and the axial support distance of the motor 31 refers to an axial distance between a front end wall of the front bearing chamber of the motor shaft 311 and a back end wall of the back bearing chamber of the motor shaft 311, where $h \leq 2L$. The signal switch 33 includes a main body 33*a*, and the trigger portion 331 is mounted to the main body 33*a*. A part of the trigger portion 331 is further partially disposed inside the main body 33*a*, and a moving direction of the trigger portion 331 extends in a straight line. The moving direction of the trigger portion 331 is further perpendicular to the output axis 361*a*.

The value for h is set within the above range so that a trigger stroke of the signal switch 33 is reduced, operation flexibility and the operation feel of the operating component 32 is improved, and the operation experience of the user is improved. On the other hand, a distance between the signal switch 33 and the control mechanism 2 is increased so that the interference of electronic components of the control mechanism 2 to the signal switch 33 is reduced. The elements h and L are marked in FIG. 1.

In this example, the signal switch 33 is substantially disposed in the first housing portion 11, and a part of the signal switch 33 may also be disposed in a transition region between the first housing portion 11 and the second housing portion 12. The transition region is a region connecting the first housing portion 11 to the second housing portion 12 and having varying outer diameters. In a direction of the rotation axis 31*a* of the motor 31, the signal switch 33 partially overlaps the motor 31. That is, a sum of a size of the signal switch 33 in a direction of the rotation axis 31*a* and a size of the motor 31 in the direction of the rotation axis 31*a* is greater than a size of a whole which is formed by the signal switch 33 and the motor 31 in the direction of the rotation axis 31*a*.

In this example, the control mechanism 2 is disposed in the third housing portion 13. The power supply 20 is a battery pack, and the motor 31 is spaced apart from the battery pack to facilitate the distribution of the weight of the whole electric tool 100 so that the body is substantially balanced in the front and back direction. The traces are more reasonable so that the traces are avoided from approaching an inner wall of the body housing 1 so as to reduce the risk of failure caused by impact by the body housing 1 when the electric tool 100 falls.

In this example, the signal switch 33 is disposed in the first housing portion 11, an outer shape of the second housing portion 12 forms the holding portion, and an interior of the second housing portion 12 is used for guiding the motor wire 34 and the control wire 35. The above arrangement makes full use of the space of the first housing portion 11. Meanwhile, the second housing portion 12 is not provided with other components, so it is beneficial to further reducing the size of the second housing portion 12 and it is convenient for the user to hold. The size of the second housing portion 12 is relatively small so that the holding is more comfortable and the operation is more convenient, thereby improving the comfort level of the operation of the user.

The signal switch 33 is disposed on one side of the bearing chamber, and a wiring channel allowing the motor wire 34 to pass through is formed in the body housing 1 on another side of the bearing chamber. The wiring channel and the signal switch 33 are disposed on two sides of the motor shaft 311 in a radial direction, respectively. The motor shaft 311 is used so that the motor wire 34 is separated from the signal switch 33 and the internal space of the body housing 1 is fully utilized without any additional structure.

The motor wire 34 and the operating component 32 are disposed on two sides of the rotation axis 31*a* of the motor shaft 311, respectively, so that the operating component 32 is spaced apart from the motor wire 34 and wear of the motor wire 34 by the operating component 32 is avoided. Specifically, the operating component 32 and the signal switch 33 are disposed on a same side of the body housing 1, which facilitates triggering of the signal switch 33 by the operating component 32.

In the first example, the trigger portion 331 of the signal switch 33 is disposed in the front and back direction in the body housing 1, and the operating component 32 slides in the front and back direction of the body housing 1. The operating component 32 includes a push button 321 and a push rod 322. The push button 321 is disposed outside the body housing 1 and slidably connected to the body housing 1. The push rod 322 is disposed in the body housing 1 and can drive the trigger portion 331 to move. The trigger portion 331 can move in a straight line to turn on and turn off the motor 31. When the trigger portion 331 is pressed by an external force, the signal switch 33 is in a closed state, and the motor 31 is turned on. When the external force is withdrawn and the trigger portion 331 rebounds, the signal switch 33 is in an open state, and the motor 31 is turned off. In this example, the moving direction of the trigger portion 331 is substantially parallel to the operating direction of the operating component 32, and the moving direction of the trigger portion 331 is perpendicular to the rotation axis 31*a*. The operating component 32 is disposed on an upper side of the rotation axis 31*a*, and the signal switch 33 is also disposed on the upper side of the rotation axis 31*a*. The signal switch 33 can effectively utilize a region on an upper side of the back bearing at the back end of the motor 33, thereby facilitating the reduction of the size of the body housing.

Specifically, one end of the push rod 322 is provided with a bent portion, and the bent portion is in contact with the trigger portion 331. When the push button 321 slides forward, the push rod 322 moves forward and acts on the trigger portion 331 via the bent portion so as to press the trigger portion 331. In order to improve the operation feel and facilitate reset of the push rod 322, the push rod 322 may be provided with a reset spring.

An outer diameter of the second housing portion 12 is less than an outer diameter of the first housing portion 11, and the second housing portion 12 is biased in a direction close to the operating component 32 with respect to the first housing portion 11. The reduction of the space occupied by the second housing portion 12 facilitates holding by the operator.

Of course, in an alternative example, the signal switch 33 may also be disposed in the transition region between the first housing portion 11 and the second housing portion 12, and the transition region is the region connecting the first housing portion 11 and the second housing portion 12 and having varying outer diameters. With the help of structural features of the first housing portion 11 and the second housing portion 12, the internal space of the body housing 1 is fully utilized without affecting the layout of other components in the body housing 1.

FIG. 1 to FIG. 2 exemplarily show a scheme in which the operating component 32 moves forward and backward to trigger or disengage the signal switch 33 in the front and back direction of the body.

Figure 3:
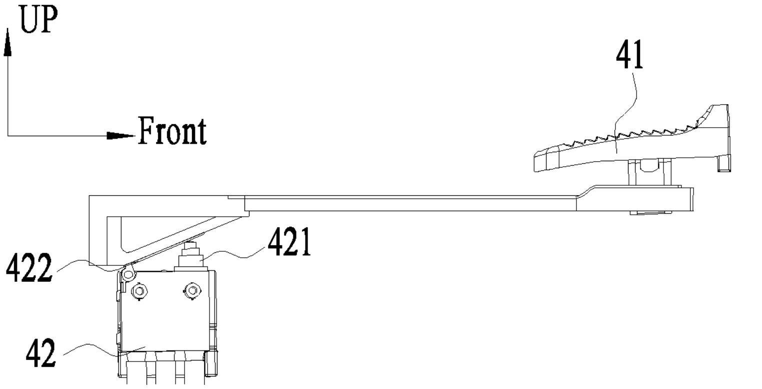
FIG. 3 is a plan view of an operating component and a signal switch in an electric tool according to a second example.

FIG. 3 illustrates an operating component 41 and a signal switch 42 in an electric tool according to a second example. The electric tool of this example differs from the first example merely in that the moving direction of the trigger portion 421 of the signal switch 42 is substantially perpendicular to the operating direction of the operating component 41. Other parts of the first example may be all applied to this example, and the details will not be repeated.

As shown in FIG. 3, the signal switch 42 is disposed in the body housing and approximately perpendicular to the rotational axis of the motor, and the moving direction of the trigger portion 421 is perpendicular to the rotation axis of the motor. The signal switch 42 is provided with a reversing piece 422, and the reversing piece 422 is specifically an elastic piece on the signal switch 42. One end of the elastic piece is connected to the signal switch 42, and the other end is a free end that can trigger the movement of the trigger portion 421. The reversing piece 422 is disposed between the operating component 41 and the signal switch 42 so that the operating direction of the operating component 41 is different from the moving direction of the trigger portion 421. The reversing piece 422 plays a function of changing the moving direction.

Figure 4:
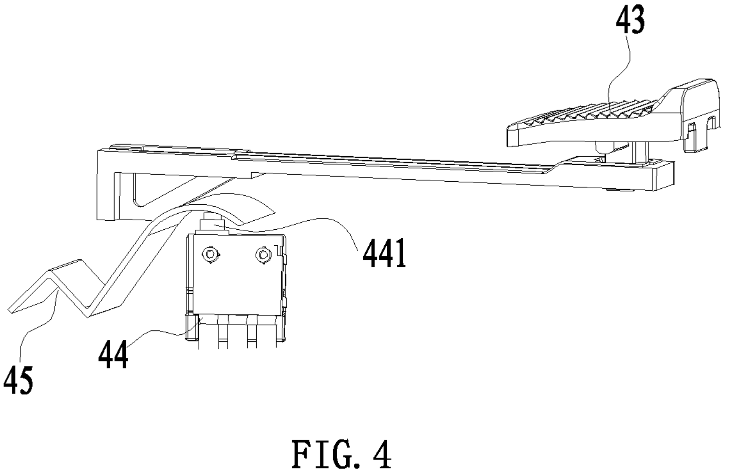
FIG. 4 is a plan view of an operating component and a signal switch in an electric tool according to a third example.

FIG. 4 illustrates an operating component 43 and a signal switch 44 in an electric tool according to a third example. The electric tool of this example differs from the first example merely in that the moving direction of the trigger portion 441 of the signal switch 44 is substantially perpendicular to the operating direction of the operating component 43. Other parts of the first example may be all applied to this example, and the details will not be repeated.

As shown in FIG. 4, the signal switch 44 is disposed in the body housing and approximately perpendicular to the rotational axis of the motor. Specifically, the signal switch 44 is disposed in the body housing in an up and down direction. The electric tool further includes a reversing piece 45 disposed between the operating component 43 and the signal switch 44, where the reversing piece 45 is an elastic piece and specifically a leaf spring. The operating component 43 is configured to move in a first linear direction to deform the elastic piece. The trigger portion 441 is configured to be driven to move in a second linear direction by deformation of the elastic piece. The second linear direction is perpendicular to the first linear direction. The first linear direction refers to a direction parallel to the rotation axis of the motor. The second linear direction refers to a direction approximately perpendicular to the rotation axis of the motor. In this example, the reversing piece 45 is disposed in the body housing and independent of the operating component 43 and the signal switch 44. One end of the reversing piece 45 is fixedly connected to the body housing, and the other end is a free end that can trigger the movement of the trigger portion 441. The reversing piece 45 causes the operating direction of the operating component 43 to be perpendicular to the moving direction of the trigger portion 441.

Figure 5:
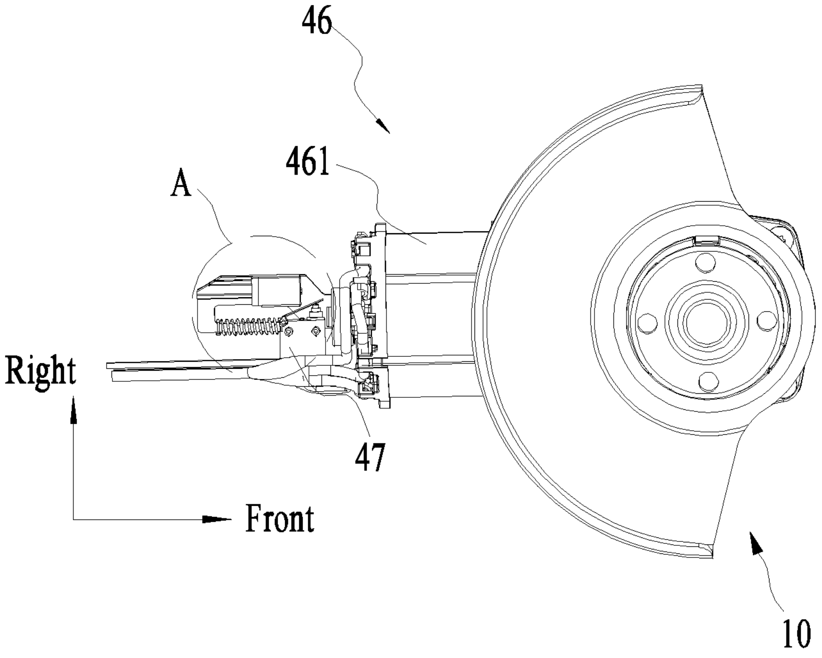
FIG. 5 is a bottom view of a partial structure of an electric tool according to a fourth example.
Figure 6:
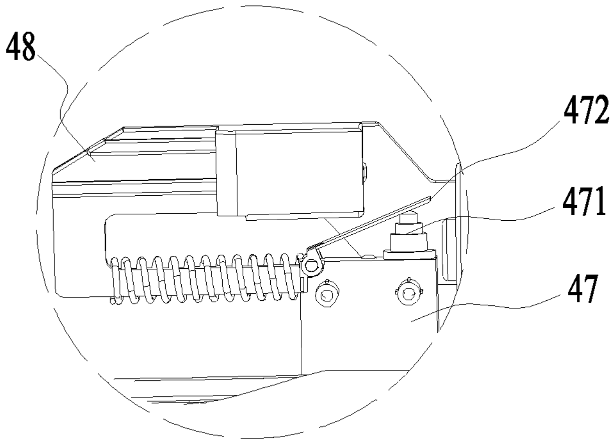
FIG. 6 is an enlarged view of a part A of FIG. 5.

FIG. 5 illustrates a partial structure of an electric tool 46 according to a fourth example. As shown in FIGS. 5 to 8, the electric tool 46 of this example differs from the first example mainly in that the signal switch 47 is disposed transversely in the body housing, the moving direction of the trigger portion 471 of the signal switch 47 is perpendicular to the rotation axis of the motor, and the moving direction of the trigger portion 471 of the signal switch 47 is also substantially perpendicular to the moving direction of the operating component 48. Alternatively, the moving direction of the trigger portion 471 of the signal switch 47 is perpendicular to the rotation axis of the motor 461, and the moving direction of the trigger portion 471 of the signal switch 47 is also perpendicular to the output axis of the output shaft.

Figure 7:
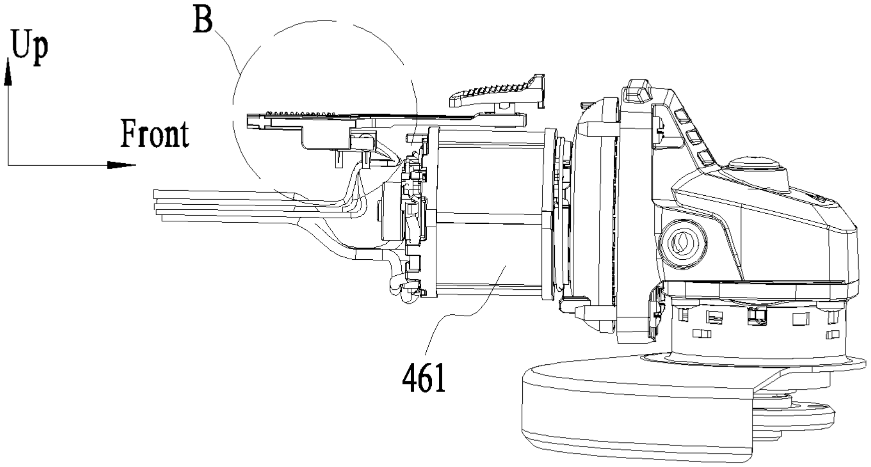
FIG. 7 is a perspective view of a structure of FIG. 5.
Figure 8:
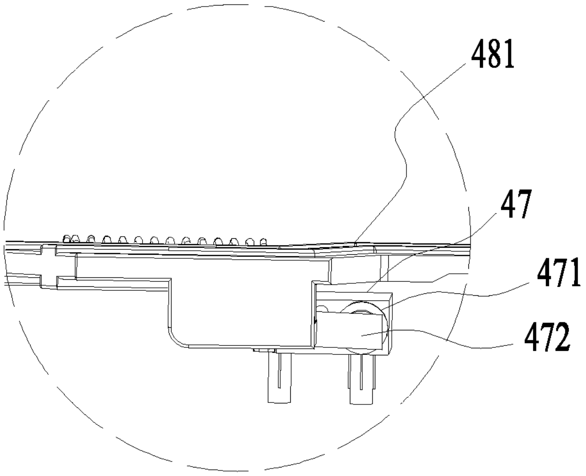
FIG. 8 is an enlarged view of a part B of FIG. 7.

In this example, the electric tool 46 further includes a reversing piece 472 disposed between the operating component 48 and the signal switch 47, where the reversing piece 45 is an elastic piece and specifically a leaf spring. The operating component 48 is configured to move in a first linear direction to deform the elastic piece. The trigger portion 471 is configured to be driven to move in a second linear direction by deformation of the elastic piece. The second linear direction is perpendicular to the first linear direction. The first linear direction refers to a direction parallel to the rotation axis of the motor 461 and specifically refers to the front and back direction of FIGS. 5 and 7. The second linear direction refers to a direction approximately perpendicular to the rotation axis of the motor 461 and specifically refers to a left and right direction of FIG. 5. In FIG. 5, "front" denotes the front and "right" denotes the right. In FIG. 7, "front" denotes the front and "up" denotes the up.

Similarly, in this example, one end of the leaf spring is a free end, and the push rod 481 of the operating component 48 is in contact with the free end of the leaf spring. Alternatively, one end of the leaf spring may be fixedly connected to the signal switch 47, the other end of the leaf spring is the free end, and the operating component 48 is in contact with the free end.

Figure 9:
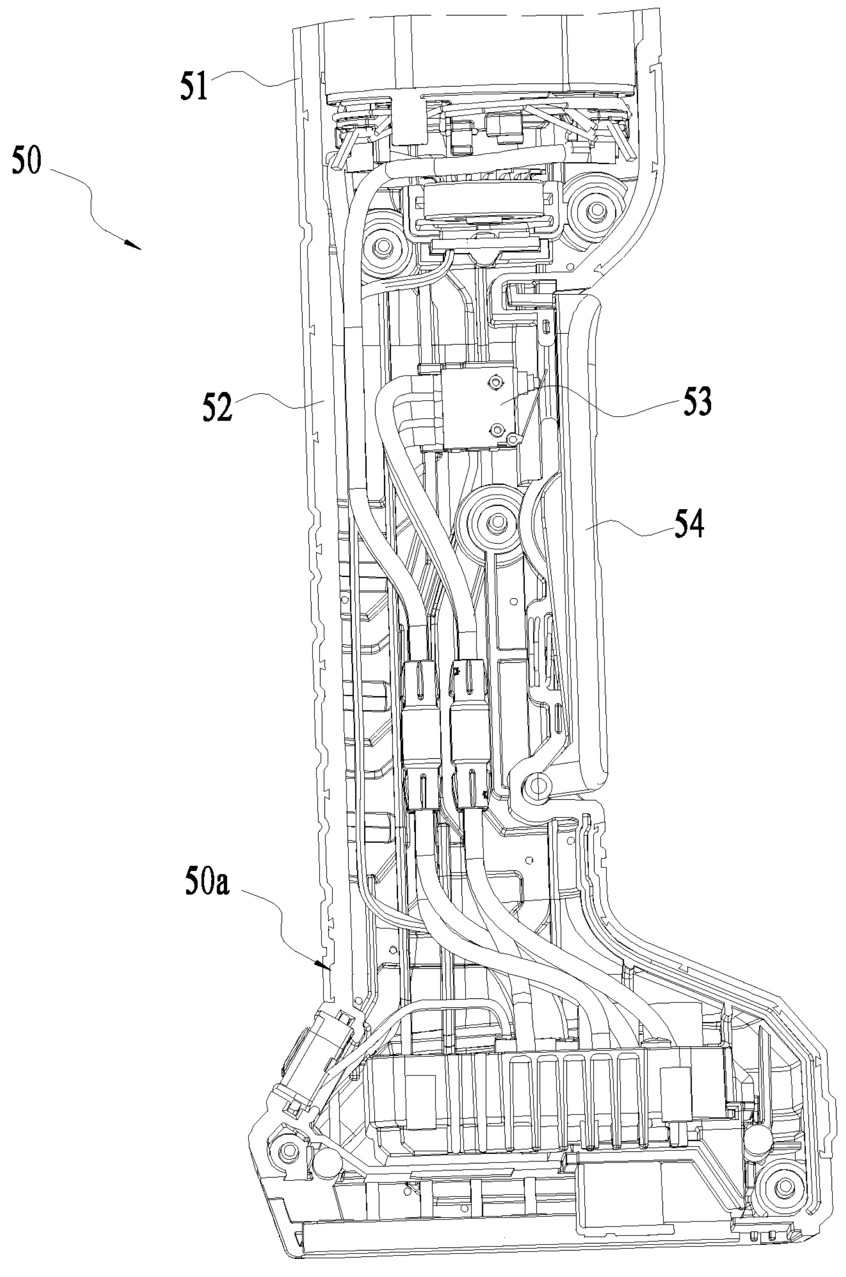
FIG. 9 is an inside view of a partial structure of an electric tool according to a fifth example.
Figure 10:
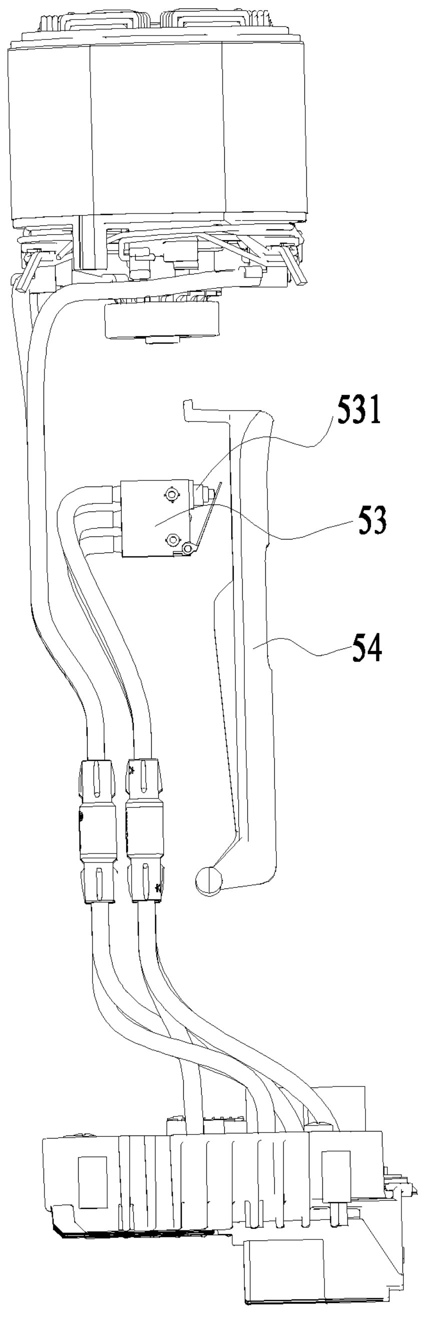
FIG. 10 is a perspective view of a partial structure of FIG. 9.

FIGS. 9 and 10 illustrate a partial structure of an electric tool 50 according to a fifth example. The electric tool 50 of this example differs from the first example mainly in that the signal switch 53 is disposed in the second housing portion 52. In this manner, the space of the second housing portion 52 is fully utilized and the size of the first housing portion 51 can be effectively reduced so that the axial layout is more reasonable.

The second housing portion 52 is formed with a holding portion, and the operating component 54 may be a trigger assembly disposed on the body housing 50*a*. The trigger assembly is pivotally connected to the body housing 50*a*, and the signal switch 53 is operated by the trigger assembly, which is more convenient and improves the comfort level of operation of the user. Specifically, the trigger assembly is disposed on a lower side of the body housing 50*a*, and the trigger portion 531 of the signal switch 53 is disposed downward.

Similarly, the signal switch 53 may be disposed in the first housing portion 51 or in a transition region between the first housing portion 51 and the second housing portion 52, where the transition region is a region connecting the first housing portion 51 and the second housing portion 52 and having varying outer diameters.

Figure 11:
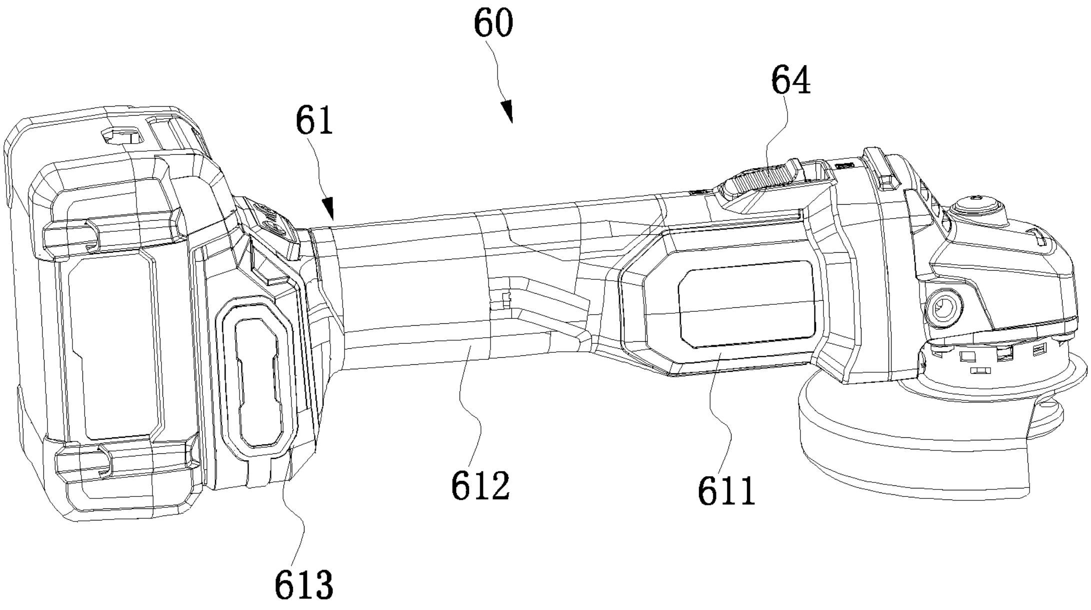
FIG. 11 is a perspective view of an electric tool according to a sixth example.

Referring to FIG. 11, FIG. 11 illustrates an electric tool 60 of a sixth example, and the electric tool is a hand-held electric tool. The electric tool 60 includes, but is not limited to, a screwdriver, an electric drill, a wrench, a sanding device, a curve saw, and other tools that are required to be powered. The electric tool 60 in this example is the sanding device and specifically a direct current angle grinder.

Figure 12:
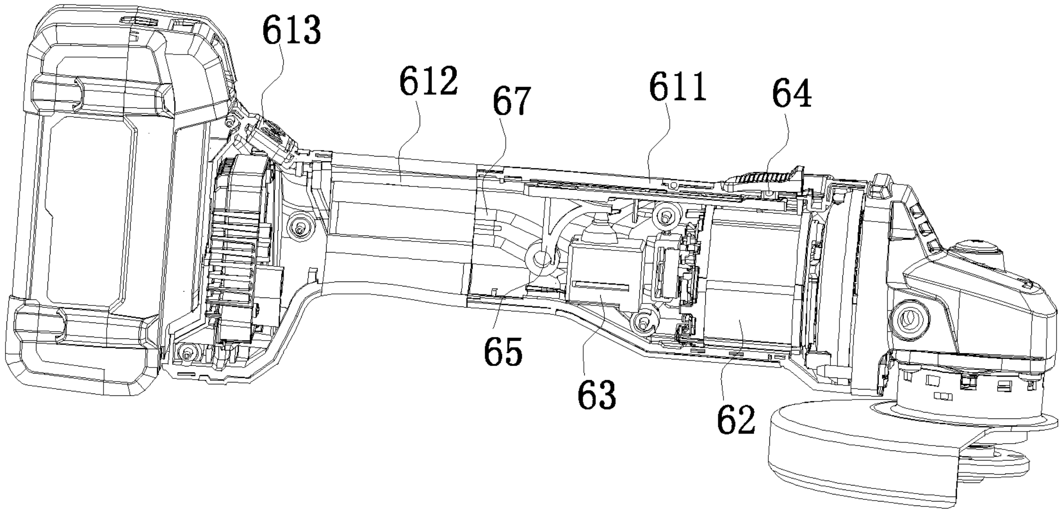
FIG. 12 is an inside view of the electric tool of FIG. 11.
Figure 13:
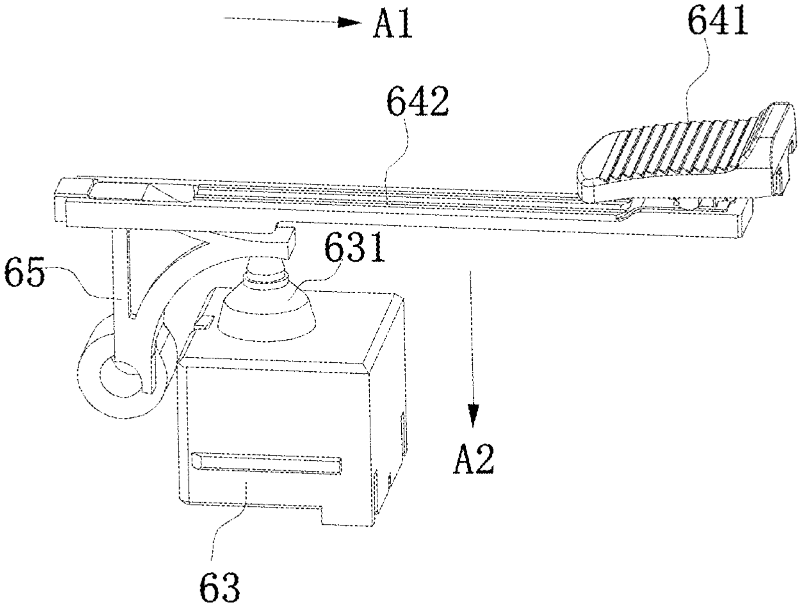
FIG. 13 is a perspective view of an operating component and a signal switch of FIG. 12.

As shown in FIGS. 11 to 13, the electric tool 60 includes a body 61, a motor 62 disposed in the body 61, and a working head connected to an output shaft of the motor 62. The working head is disposed in front of the body 61, and the motor 62 can drive the working head to rotate when the motor 62 is started. A battery pack is disposed at the back of the body 61, and the battery pack provides power for the motor 62. The body 61 is provided with a holding portion which is convenient for a human to hold with a hand.

The body 61 extends in the front and back direction, where the front and back direction refers to a direction substantially parallel to an axis of the motor. The body 61 includes a first barrel 611, a second barrel 612, and a battery mounting portion 613 which are connected in sequence from front to back. The motor 62 is disposed in the first barrel 611, the working head is disposed in front of the first barrel 611, and an outer diameter of the second barrel 612 is less than an outer diameter of the first barrel 611. In this example, the second barrel 612 is biased inward with respect to the first barrel 611, which may be understood as the second barrel 612 being sunken inward in a radial direction, thereby facilitating holding for the user. The battery mounting portion 613 is provided with the battery pack, the battery pack is disposed at the back of the body 61, and the battery mounting portion 613 is provided with an air inlet so as to facilitate heat dissipation.

As shown in FIGS. 12 and 13, the electric tool 60 further includes a switch structure 63, an operating component 64, and a reversing structure 65. The switch structure 63 has a trigger portion 631 for turning on or off the motor 62. The operating component 64 is movable in the front and back direction of the body, where the operating component 64 may be disposed at a position convenient for manual operation, which is not limited herein. The reversing structure 65 is disposed between the operating component 64 and the switch structure 63. The reversing structure 65 is configured to convert the movement of the operating component 64 in a first direction into the movement of the trigger portion 631 in a second direction, where the second direction is perpendicular to the first direction.

The operating component 64 is disposed above the first barrel 611 so as to facilitate operation. The switch structure 63 is disposed in the second barrel 612 or a transition region between the first barrel 611 and the second barrel 612, and the transition region is a region connecting the first barrel 611 and the second barrel 612 and having varying outer diameters. The trigger portion 631 is disposed in a direction perpendicular to the front and back direction of the body so as to facilitate cooperation with the reversing structure 65. In this example, the trigger portion 631 is disposed facing the operating component 64, that is, the trigger portion 631 is disposed upward as shown in FIG. 12.

The electric tool 60 further includes a control mechanism, and the control mechanism is disposed in the body 61. The switch structure 63 is connected to the control mechanism through a wire 67, the second barrel 612 includes a wiring channel for guiding the wire 67, and the control mechanism is disposed in the second barrel 612 or the battery mounting part 613. In this example, the control mechanism is disposed in the battery mounting part 613 so that the second barrel 612 is used for wiring. The reduction of structural parts in the second barrel 612 facilitates a further reduction of the outer diameter of the second barrel 612. In this manner, a smaller holding outer diameter is obtained, thereby improving the holding feel of the user. Of course, in an alternative example, since the second barrel 612 has a relatively sufficient internal space, the control mechanism may also be disposed in the second barrel 612.

As shown in FIG. 13, the operating component 64 in this example includes a push button 641 and a push rod 642 fixedly connected to the push button 641. The push button 641 is slidably connected to the body 61 and drives the push rod 642 to perform reciprocating motion in a direction parallel to the front and back direction. The reciprocating motion of the push rod 642 drives through the reversing structure 65 the trigger portion 631 to move in a turning-on or turning-off direction. During operation, the push button 641 can be pushed by a hand so that the push button 641 drives the push rod 642 to slide in the first direction, where for the first direction, reference may be made to the direction indicated by arrow A1 in FIG. 13, and the push rod 642 drives through the reversing structure 65 the trigger portion 631 to move in the second direction when the push rod 642 slides, where for the second direction, reference may be made to the direction indicated by arrow A2 in FIG. 13. Specifically, A1 refers to a direction substantially parallel to the axis of the body or the axis of the motor, and A2 refers to a direction substantially perpendicular to the axis of the body or the axis of the motor. The push button 641 is disposed outside the body 61, the push rod 642 is disposed inside the body 61, and a length of the push rod 642 is set according to actual requirements.

In this example, a mode of rotational triggering is adopted. The reversing structure 65 is rotatably connected to the body, the reversing structure 65 is disposed on a movement path of the operating component 64, and the trigger portion 631 is disposed on a rotation path of the reversing structure 65. The operating component 64 moves in the first direction to drive the reversing structure 65, and the trigger portion 631 is configured to be driven by the reversing structure 65 to move in the second direction to turn on and turn off the motor 62.

When the push button 641 drives the push rod 642 to slide in the first direction, the push rod 642 pushes the reversing structure 65 to rotate clockwise around its own axis in FIG. 13. When the reversing structure 65 rotates, the trigger portion 631 is driven to move in the second direction to turn on the switch. When the push button 641 drives the push rod 642 to slide in a direction opposite to the first direction, the push rod 642 pushes the reversing structure 65 to rotate counterclockwise around its own axis in FIG. 13. The reversing structure 65 disengages the trigger portion 631 during rotation so that the trigger portion 631 can automatically bounce and the switch is turned off.

The reversing structure 65 is rotatably connected to the body 61 through a rotating shaft, the rotating shaft is fixedly connected to the body 61, the reversing structure 65 is provided with a mounting hole, and the reversing structure 65 is sleeved on the rotating shaft through the mounting hole. Of course, the rotating shaft may also be fixedly connected to the reversing structure 65, the body 61 is provided with a mounting hole, and one end of the rotating shaft is disposed through the mounting hole.

Referring to FIG. 13, the reversing structure 65 is a reversing block, and the reversing block is in a triangular-like shape, where one end arm is rotatably connected to the body 61, a second end arm is connected to the push rod 642, and a third end arm is configured to trigger the trigger portion 631. Specifically, the push rod 642 is provided with a sliding groove, the second end arm of the reversing block extends into the sliding groove, and the reversing block is configured to be driven by the movement of the operating component 64 so as to rotate close to or away from the trigger portion 631. When the push button 641 drives the push rod 642 to slide in the first direction, the sliding groove moves accordingly to drive the reversing block to rotate around its own axis, and the third end arm of the reversing block rotates in the direction close to the trigger portion 631 so as to drive the trigger portion 631 to move in the second direction. Of course, the reversing block may be provided to be in a sector-like shape or other structures and is not limited to the above configuration, so long as the case that the trigger portion 631 can be triggered by rotation is satisfied. The reversing block of such a structure occupies a small space and has a stable fit with the push rod 642.

In other examples, the reversing structure may also be connected to the operating component, the moving direction of the reversing structure may be the same as the moving direction of the operating component, the reversing structure is provided with a reversing surface obliquely intersecting the moving direction, and the moving direction of the operating component is different from the moving direction of the trigger portion through the reversing surface. Alternatively, in other examples, the reversing structure may also be an elastic piece, and the reversing structure may be the same as the reversing piece 45 in FIG. 4.

Figure 14:
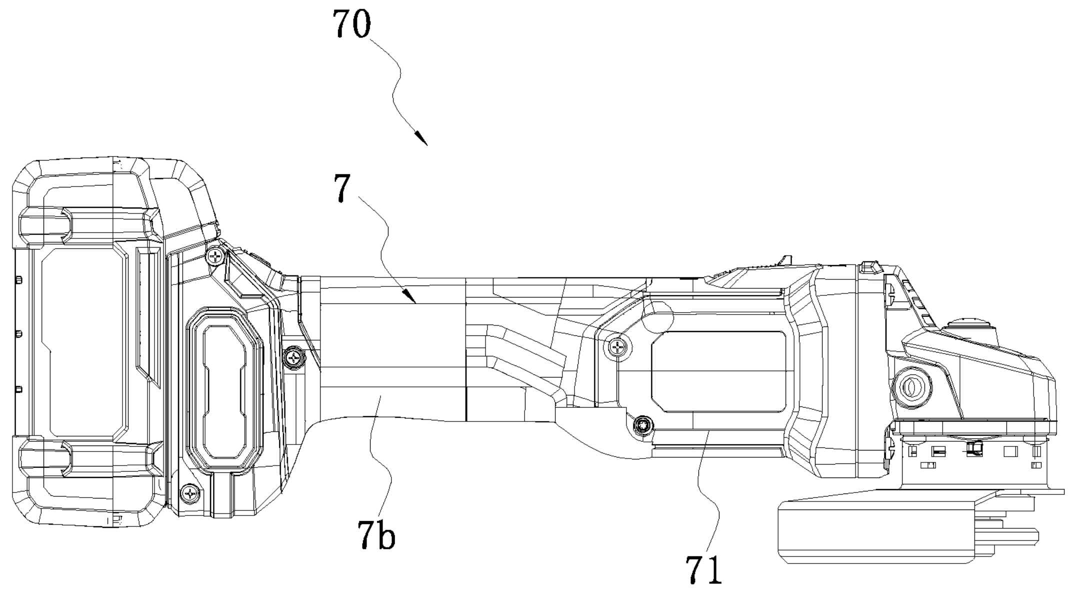
FIG. 14 is a plan view of an electric tool according to a seventh example.
Figure 15:
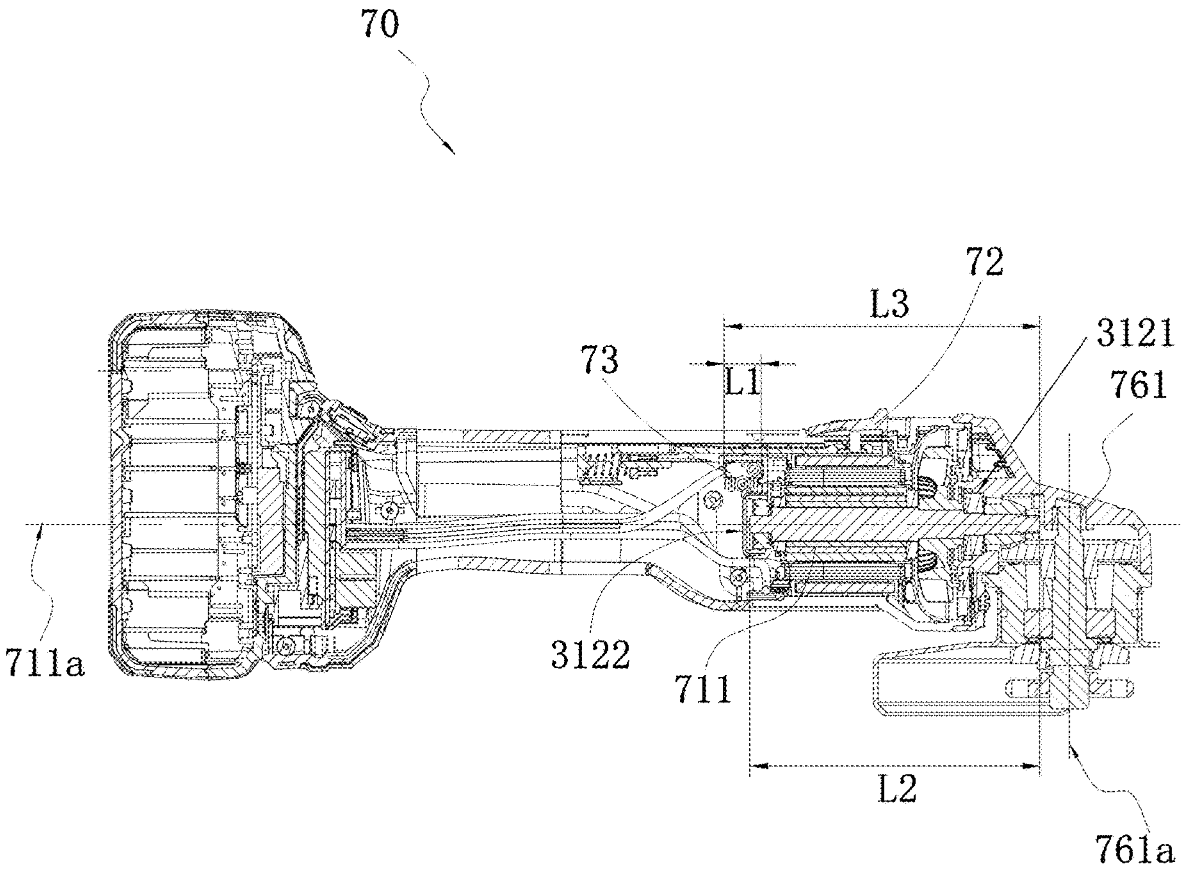
FIG. 15 is a sectional view of the electric tool of FIG. 14.
Figure 16:
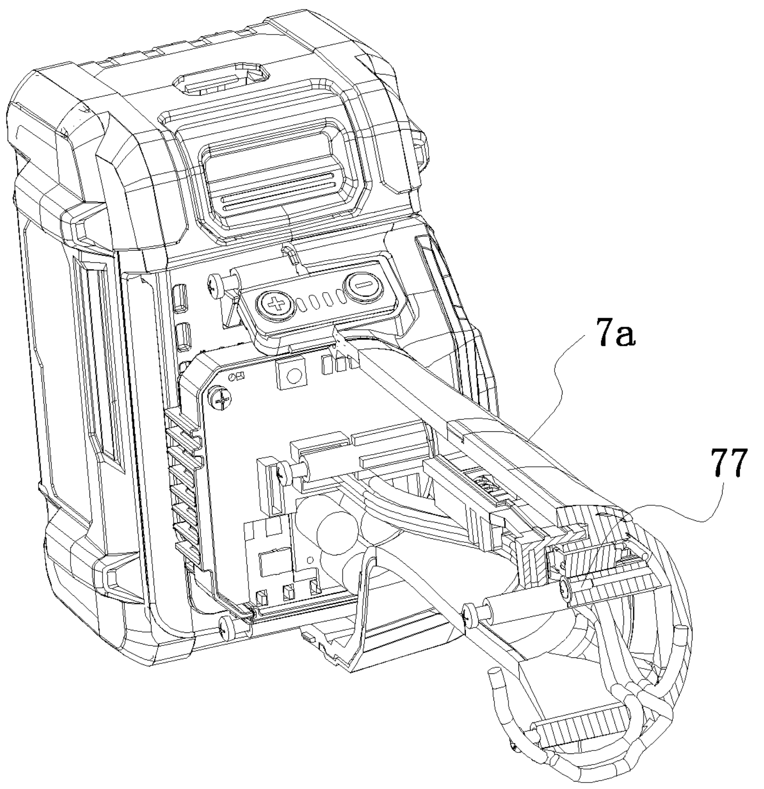
FIG. 16 is a perspective view of a partial structure of the electric tool of FIG. 14.
Figure 17:
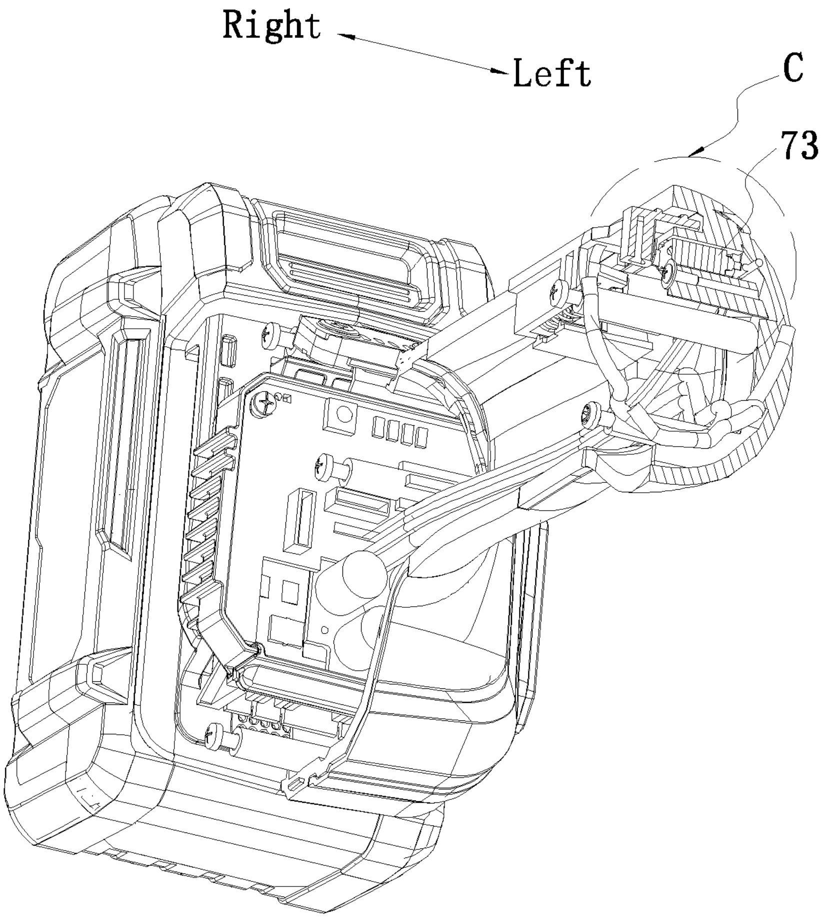
FIG. 17 is a perspective view of a structure of FIG. 16 from another angle.
Figure 18:
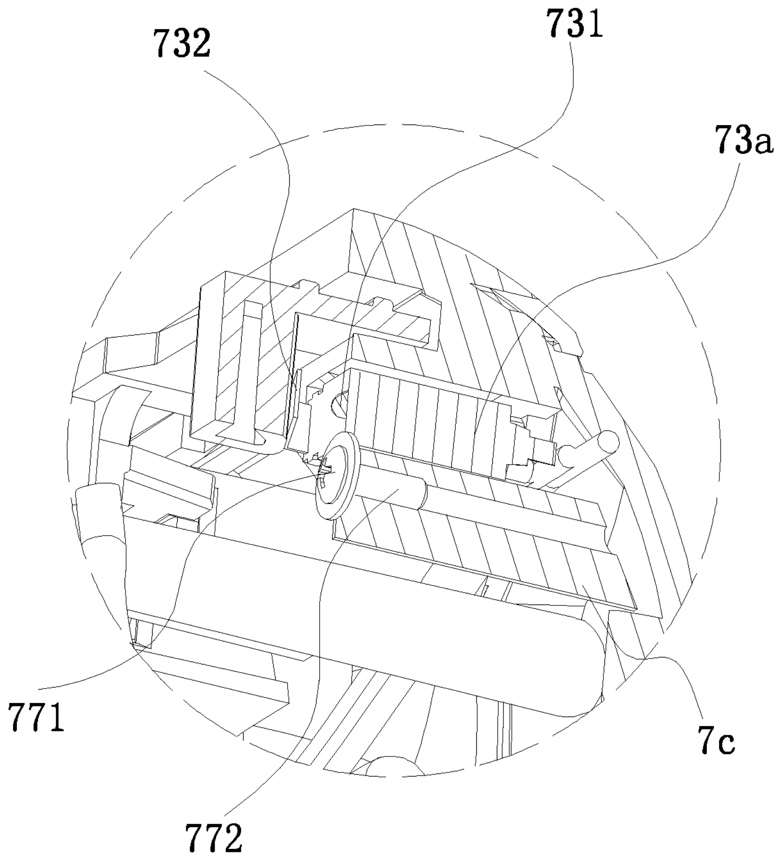
FIG. 18 is an enlarged view of a region C of FIG. 17.

FIG. 14 illustrates an electric tool 70 according to a seventh example. The electric tool 70 of this example differs from the electric tool 100 of the first example mainly in a manner of mounting the signal switch 73 and a placement direction of the signal switch 73. Other parts of the first example may be all applied to this example, and the details will not be repeated.

As shown in FIGS. 14 to 18, the signal switch 73 is disposed in the body housing 7 in the left and right direction. The moving direction of the trigger portion 731 of the signal switch 73 is perpendicular to the operating direction of the operating component 72, the moving direction of the trigger portion 731 of the signal switch 73 is further perpendicular to the rotation axis 711*a* of the motor 711, and the moving direction of the trigger portion 731 of the signal switch 73 is also perpendicular to the output axis 761*a* of the output shaft 761. In this manner, the signal switch 73 may be disposed above the back bearing of the motor 711 so that a smaller space in the body housing 7 may be occupied. In this manner, the signal switch 73 may be disposed in the first housing portion 71.

In a direction of the rotation axis 711*a* of the motor 711, the signal switch 73 partially overlaps the motor 711. That is, a sum of a size L1 of the signal switch 73 in the direction of the rotation axis 711*a* and a size L2 of the motor 711 in the direction of the rotation axis 711*a* is greater than a size L3 of a whole which is formed by the signal switch 73 and the motor 711 in the direction of the rotation axis 711*a*, that is, L1+L2>L3.

In this example, the body housing 7 includes a left housing portion 7*a* and a right housing portion 7*b* separable from each other. The left housing portion 7*a* may be fixedly connected to the right housing portion 7*b* through a screw. The signal switch 73 is fixedly mounted to the left housing portion 7*a*. In other examples, the signal switch 73 may also be fixedly mounted to the right housing portion 7*b*. In this manner, the signal switch 73 is fixedly mounted on half of the housing, thereby simplifying the structure of the body housing 7. Compared with a manner in which the signal switch 73 is fixed by the collective functioning of the left housing portion 7*a* and the right housing portion 7*b*, a manner in which the signal switch 73 is fixed with merely half of the housing makes the mounting simpler and the space occupied by the signal switch 73 smaller, so that the signal switch 73 can be more stably mounted to the body housing 7.

In this example, the electric tool 70 further includes a mounting piece 77 for fixedly mounting the signal switch 73 to the left housing portion 7*a*. The mounting piece 77 is specifically a screw including a screw head 771 and a screw stem 772. A mounting post 7*c* extends from the left housing portion 7*a*, a threaded hole for the screw stem 772 to be inserted into is formed in the mounting post 7*c*, and the screw stem 772 is inserted into the threaded hole. One part of the screw head 771 is in contact with the mounting post 7*c*, and another part is in contact with the signal switch 73, so that the signal switch 73 is held between the screw head 771 and the body housing 7 by being pressed by the screw.

In this example, the signal switch 73 includes a main body 73*a*, the trigger portion 731 is mounted to the main body 73*a*, the trigger portion 731 is disposed at least partially in the main body 73*a*, and the trigger portion 731 is further provided with an elastic piece 732. When the elastic piece 732 is operated by the operating component 72, the elastic piece 732 can trigger the trigger portion 731 to move so as to drive the signal switch 73 to turn on.

The above examples describe basic principles and characteristics and various modifications and changes may be made to these examples without departing from the spirit and scope of the descriptions set forth herein. These modifications and changes are intended to fall within the scope of the appended claims.

What is claimed is:

1. An electric tool, comprising:

a body housing comprising a first housing portion, a second housing portion, and a third housing portion which are arranged sequentially from front to back, wherein the first housing portion is connected to a working assembly, the third housing portion is connected to a power supply, and the second housing portion for a user to hold;

a control mechanism disposed in the body housing and to control operation of the working assembly, wherein the control mechanism is electrically connected to the power supply;

a motor supported in the first housing portion by a bearing disposed in a bearing chamber, wherein the motor is electrically connected to the control mechanism through a motor wire, and the motor includes a motor shaft rotatable around a rotation axis;

a signal switch electrically connected to the control mechanism through a control wire and comprising a trigger portion capable of being triggered to control start-up or interruption of the motor, the signal switch is disposed in, an enclosure between a back bearing of the motor and the body housing, above the back bearing of the motor, and in a direction of the rotation axis of the motor, the signal switch partially overlaps the motor;

an operating component slidably disposed on the body housing, wherein the operating component slidably moves on the body housing to turn on or off the signal switch, an operating direction of the operating component is substantially parallel to the rotation axis of the motor; and, an output assembly wherein the output assembly comprises an output shaft rotatable about an output axis and the output axis is substantially perpendicular to a moving direction of the trigger portion, wherein the moving direction of the trigger portion of the signal switch is perpendicular to the operating direction of the operating component, and wherein the signal switch comprises a main body, the trigger portion is mounted to the main body and disposed at least partially in the main body, the trigger portion comprises an elastic piece, when the elastic piece is operated by the operating component, the elastic piece triggers the trigger portion to move in a left and right direction to drive the signal switch to turn on.

2. The electric tool of claim 1, wherein a sum of a size of the signal switch in a direction of the rotation axis and a size of the motor in the direction of the rotation axis is greater than a size, in the direction of the rotation axis, of the signal switch and the motor together as they are positioned in the electric tool.

3. The electric tool of claim 1, further comprising a reversing piece disposed between the operating component and the signal switch wherein the reversing piece is disposed between the operating component and the signal switch such that the operating direction of the operating component is different from the moving direction of the trigger portion.

4. The electric tool of claim 1, wherein the body housing comprises a left housing portion and a right housing portion separable from each other, and the electric tool further comprises a mounting piece to mount the signal switch to one of the left housing portion and the right housing portion.

5. The electric tool of claim 4, wherein the mounting piece is a screw.

6. The electric tool of claim 1, wherein the body housing extends substantially in a straight line and an outer diameter of the second housing portion is less than an outer diameter of the first housing portion.

7. The electric tool of claim 1, wherein a carrying current of the motor wire is greater than a carrying current of the control wire.

8. The electric tool of claim 1, wherein the signal switch is disposed on an upper side of the rotation axis of the motor.

9. The electric tool of claim 1, wherein the electric tool is an angle grinder.

10. The electric tool of claim 9, wherein the signal switch and the operating component are both disposed on an upper side of the rotation axis of the motor.

11. The electric tool of claim 1, wherein the signal switch further comprises an elastic piece and the elastic piece of the signal switch triggers the trigger portion to drive the signal switch to turn on in response to the elastic piece being operated by the operating component.

12. The electric tool of claim 1, wherein the body housing comprises a left housing portion and a right housing portion separable from each other, and the signal switch is mounted to one of the left housing portion and the right housing portion.

13. The electric tool of claim 1, wherein the bearing used for positioning the motor is located on a rear side of the motor, and the signal switch is not overlapped with the bearing if observing in a front-back direction.

* * * * *